(12) United States Patent
Meyer

(10) Patent No.: US 11,960,648 B2
(45) Date of Patent: Apr. 16, 2024

(54) METHOD FOR DETERMINING A CURRENT VIEWING DIRECTION OF A USER OF DATA GLASSES WITH A VIRTUAL RETINA DISPLAY AND DATA GLASSES

(71) Applicant: Robert Bosch GmbH, Stuttgart (DE)

(72) Inventor: Johannes Meyer, Haseluenne (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/189,520

(22) Filed: Mar. 24, 2023

(65) Prior Publication Data

US 2023/0324991 A1 Oct. 12, 2023

(30) Foreign Application Priority Data

Apr. 12, 2022 (DE) ...................... 10 2022 203 677.8

(51) Int. Cl.
*G06F 3/01* (2006.01)
*G02B 26/10* (2006.01)
*G02B 27/00* (2006.01)
*G02B 27/01* (2006.01)

(52) U.S. Cl.
CPC ........... *G06F 3/013* (2013.01); *G02B 26/106* (2013.01); *G02B 27/0093* (2013.01); *G02B 27/0172* (2013.01); *G02B 2027/014* (2013.01); *G02B 2027/0187* (2013.01)

(58) Field of Classification Search
CPC ... G06F 3/013; G02B 26/106; G02B 27/0093; G02B 27/0172; G02B 2027/014; G02B 2027/0187

USPC .......................................................... 345/156
See application file for complete search history.

(56) References Cited

U.S. PATENT DOCUMENTS

| | | | |
|---|---|---|---|
| 2013/0010207 A1* | 1/2013 | Valik ..................... | G06F 3/0304 704/E21.001 |
| 2016/0085299 A1* | 3/2016 | Horesh ................ | A61B 3/0025 345/156 |
| 2017/0285337 A1* | 10/2017 | Wilson ................... | A61B 3/145 |
| 2018/0284887 A1* | 10/2018 | Fan ......................... | G06F 3/038 |
| 2018/0350070 A1* | 12/2018 | Ishii ........................ | G06T 7/70 |
| 2019/0045125 A1* | 2/2019 | Järvenpää ............... | G06F 3/013 |
| 2019/0318181 A1* | 10/2019 | Katz ........................ | G06F 3/012 |
| 2020/0103980 A1* | 4/2020 | Katz ........................ | G06F 3/167 |
| 2021/0041701 A1* | 2/2021 | Kassner .................. | G06F 3/013 |
| 2021/0049410 A1* | 2/2021 | Dierkes ................... | G06N 3/08 |
| 2021/0064030 A1* | 3/2021 | Jiang ................ | G08G 1/096877 |
| 2022/0198789 A1* | 6/2022 | Kassner ................. | G06V 40/19 |
| 2022/0236796 A1* | 7/2022 | Konrad .................. | G09G 3/002 |

* cited by examiner

*Primary Examiner* — Tom V Sheng
(74) *Attorney, Agent, or Firm* — NORTON ROSE FULBRIGHT US LLP; Gerard A. Messina

(57) ABSTRACT

A method for determining a current viewing direction of a user of a pair of data glasses having a virtual retina scan display. The method includes at least the method steps: projecting at least substantially parallel infrared laser beams onto an eye of a user of the data glasses, acquiring two-dimensional images from the infrared laser beams reflected back by the eye of the user, and determining pupil contours in the acquired two-dimensional images. The instantaneous viewing direction of the user of the data glasses is ascertained from a comparison of an instantaneous elliptical shape of the pupil contour with an elliptical shape of a reference pupil contour.

12 Claims, 6 Drawing Sheets

METHOD FOR DETERMINING A CURRENT VIEWING DIRECTION OF A USER OF DATA GLASSES WITH A VIRTUAL RETINA DISPLAY AND DATA GLASSES

CROSS REFERENCE

The present application claims the benefit under 35 U.S.C. § 119 of German Patent Application No. DE 10 2022 203 677.8 filed on Apr. 12, 2022, which is expressly incorporated herein by reference in its entirety.

BACKGROUND INFORMATION

A method has already been proposed in the related art in which pupils of users are recognized through the method steps of a) projecting at least substantially parallel infrared laser beams onto an eye of a user of the data glasses, b) capturing two-dimensional images from the infrared laser beams reflected back by the eye of the user, and c) determining pupil contours in the acquired two-dimensional images.

SUMMARY

The present invention relates to a method for determining an instantaneous viewing direction, in particular a view vector, of a user of data glasses with a virtual retina display (retina scan display). According to an example embodiment of the present invention, the method includes the following method steps: a) projecting at least substantially parallel, preferably scanned, infrared laser beams onto an eye of a user of the data glasses, b) acquiring two-dimensional images from the infrared laser beams reflected back by the eye of the user, and c) determining pupil contours in the acquired two-dimensional images.

According to an example embodiment of the present invention, it is provided that the instantaneous viewing direction of the user of the data glasses, in particular the instantaneous view vector of the user of the data glasses, is ascertained from a comparison of an instantaneous elliptical shape of the pupil contour with an elliptical shape of a reference pupil contour. This can advantageously enable a particularly simple calculation of eye models, which in particular can save resources and energy. In addition, a particularly robust determination of the view vector can advantageously be enabled. In particular, the present invention provides a particularly advantageous embodiment of a model-based eye tracking approach for data glasses with virtual retina display.

"Data glasses" are to be understood in particular as a wearable device (head-mounted display) by which information can be added to the field of vision of a user. Preferably, data glasses enable augmented reality and/or mixed reality applications. Data glasses are also commonly referred to as smart glasses. A "virtual retinal display" is to be understood in particular as a retinal scan display or a light field display in which the image content is sequentially scanned by deflecting at least one light beam, in particular a laser beam from at least one time-modulated light source, such as one or more laser diodes, and is imaged directly onto the retina of the eye of the user by optical elements. The image source is designed in particular as an electronic image source, for example as a graphics output, in particular an (integrated) graphics card, of a computer or processor or the like. The virtual retina display includes at least one scanned laser projector for this purpose. In particular, the scanned laser projector is set up to radiate the image content from the image data in the form of scanned and/or rasterized light beams. The scanned laser projector is at least designed to output the scanned infrared laser beam. In addition, the scanned laser projector can be provided to output a scanned visible laser beam in order to produce the image content perceivable by the user. In particular, the scanned laser projector includes a deflection device, preferably a MEMS mirror (micromirror actuator), at least for the controlled deflection of the at least one light beam of the light source of the projector unit. In particular, the scanned at least substantially parallel infrared laser beam illuminates at least a large part of a surface of the eye of the user. In particular, a scanning area of the infrared laser beam is significantly larger than a maximum human pupil diameter.

According to an example embodiment of the present invention, the two-dimensional image reflected back by the eye of the user is acquired by a detector. The detector can here be integrated into the data glasses, for example into the laser projector of the data glasses, or separate from the laser projector of the data glasses. In the case of the integrated design of the detector, a particularly low susceptibility to interfering light can advantageously be achieved. With the separate design of the detector, a particularly large field of view can advantageously be realized, in which in particular contextual information relating to where the pupil is located relative to the eye can also be acquired. In particular, the integrated embodiment of the detector uses the so-called bright pupil effect, which is well-known to those skilled in the art, to record the pupil. In particular, in the separate embodiment of the detector the so-called dark pupil effect, well-known to those skilled in the art, is used to record the pupil. Alternatively, the detector can also be designed separately from the data glasses and can be in communicative connection with the data glasses. In particular, the detector acquires a two-dimensional image. In particular, the region of acquisition of the detector is here larger than a maximum human pupil size. In particular, the pupil contour is ascertained by computer-implemented evaluation of the two-dimensional images of the detector. In particular, the ascertaining of the pupil contour takes place in automated fashion and/or at least almost in real time.

In particular, according to an example embodiment of the present invention, the pupil contour ascertained from the two-dimensional detector image has (due to perspectival distortion) an appearance that in each case is a function of the view vector. For example, in a rigid straight-ahead view with a viewing vector at least substantially antiparallel to a direction of incidence of the infrared laser beams, the pupil contour appears as at least substantially round in the two-dimensional image. "Substantially parallel/antiparallel" is here to be understood in particular as referring to an orientation of a direction relative to a reference direction, in particular in a plane, the direction having a deviation relative to the reference direction that is in particular smaller than 8°, advantageously smaller than 5°, and particularly advantageously smaller than 2°. For example, when looking upward in the two-dimensional image the pupil contour appears as oval and compressed in the vertical direction compared to the round shape of the straight view. In addition, the position of the pupil contour is then situated above the round shape of the straight view. For example, when looking to the left in the two-dimensional image the pupil contour appears as oval and compressed in the horizontal direction compared to the round shape of the straight view. In addition, the position of the pupil contour is then situated to the left of the round shape of the straight view. In particular, information about a relative position of the instantaneous ellipse shape of the pupil contour compared to a known/calibrated position of the reference pupil contour is included in the ascertaining of the instantaneous view direction/instantaneous view vector.

Advantageously, according to an example embodiment of the present invention, the reference pupil contour corresponds to the pupil contour that is acquired while the user is looking straight ahead through lenses of the data glasses. This can advantageously enable a reliable and/or simple determination of the viewing direction, in particular by selecting a reference point that can be easily and reliably reproduced. In particular, the reference pupil contour is ascertained in a calibration step in which the user is required, in particular instructed, to look straight ahead. Due to the configuration of the scanning field of the infrared laser beam (parallel rays from the eyeglass lens to the user's eye), a size of the imaged pupil, in particular the reference pupil contour, is independent of a vertex distance between the eye and the eyeglass lens. As a result, there is advantageously no optical distortion, and there is a clear imaging of the pupil in the two-dimensional image. For an initial calibration in the calibration step, a marker can be virtually represented by the visible projection of the virtual retinal display as a reference. Alternatively, an implicit cyclic calibration could take place through the displaying of visible image contents over the contents of the virtual retina display in the center of a field of view of the user. In particular, the reference pupil contour appears as a round ellipse in the two-dimensional image. In particular, the elliptical shape of the reference pupil contour is formed as a special case of an ellipse, in which the ellipse forms an at least substantially round circle.

According to an example embodiment of the present invention, it is further provided that in at least one method step, an eyeball center of the eye of the user is estimated and/or determined on the basis of the reference pupil contour. In this way, a starting point for the view vector determination can advantageously be defined. In particular, a typical eyeball diameter of the human eye is assumed for the determination of the eyeball center. The typical eyeball diameter of the human eye is approximately 24 mm. In particular, the estimation and/or determination of the eyeball center is made by a computer program of a computing unit of the data glasses.

If a center of the instantaneous elliptical shape of the pupil contour is determined here in at least one method step, a particularly precise determination of the eyeball center can advantageously be made. In particular, the eyeball center is ascertained by lengthening a straight line standing perpendicular to an image plane of the two-dimensional image by half a typical eyeball diameter. The "instantaneous elliptical shape of the pupil contour" is in particular the pupil contour ascertained at a particular measurement time and constantly dynamically changing due to movements of the eye of the user, in each case currently ascertained by the computing unit. In particular, the determination of the center of the elliptical shape of the pupil contour is done in automated fashion by a computer program of a computing unit of the data glasses. In particular, for this purpose an ellipse is fitted into the image of the pupil ascertained by the detector. The center of the instantaneous elliptical shape of the pupil contour is here determined as a position of an intersection of two mutually perpendicular mirror axes of the ellipse. The center of the instantaneous elliptical shape of the pupil contour is here determined as a position of an intersection of the major axis and the minor axis of the ellipse.

Furthermore, according to an example embodiment of the present invention, it is provided that in at least one method step the instantaneous view vector is ascertained, in particular in spherical coordinates, by a (virtual) linear connection of the eyeball center, in particular determined and defined in the calibration step, and the center of the instantaneous ellipse shape. This can advantageously enable simple and/or reliable view direction determination/view vector determination. In particular, the view vector runs parallel to the linear connection between the center of the eyeball and the center of the instantaneously ascertained elliptical shape.

According to an example embodiment of the present invention, it is further provided that in at least one method step, the ascertained view vector is used for a view-direction-guided operation and/or navigation of the virtual retinal display. This can advantageously enable a simple, in particular hands-free, operation of the data glasses, in particular of programs of the data glasses.

Alternatively or in addition, it is provided that in at least one method step the view vector is used for adaptive tracking of image contents projected by the virtual retinal display onto a retina of the eye of the user, such that an enlargement can be achieved of a perceived field of view of the virtual retinal display. In this way, a particularly high level of user friendliness can be achieved. In particular, the adaptive tracking is carried out in an automated fashion by the computing unit of the data glasses.

According to an example embodiment of the present invention, in addition, it is provided that in at least one method step, a displacement, in particular a planar translational and/or rotational displacement, of the data glasses, in particular of the lenses of the data glasses, relative to the eye of the user is recognized by comparing an instantaneous position of the pupil contour in a currently ascertained two-dimensional image with a position of the reference pupil contour in the two-dimensional image. In this way, a high robustness of a determination of the view vector, in particular against planar translational and/or rotational displacements of the data glasses, can advantageously be achieved. Advantageously, a high degree of user friendliness can be achieved. In particular, a "planar translational displacement" is to be understood as a displacement that runs at least substantially parallel to an image plane/detector plane and/or to a surface of the eye of the user. In particular, when the data glasses are tilted or displaced in a planar translational manner, the position of the round pupil contour in the detector image, which can be assigned to a straight-ahead view, is displaced in comparison to the position of the previously (before the displacement) valid reference pupil contour. Thus, in order to enable a further exact determination of the direction of view, a new determination of the currently (after the displacement) valid new reference pupil contour, and thus also of a new valid eyeball center, becomes necessary.

In this connection, it is provided that the comparison of the instantaneous position of the pupil contour with the position of the reference pupil contour is carried out when a substantial agreement of the instantaneous elliptical shape of the pupil contour with the elliptical shape of the reference pupil contour is recognized, in particular when the instantaneous elliptical shape of the pupil contour is recognized as round. In this way, an automation of a recalibration of the view direction recognition can advantageously be achieved. Advantageously, a high degree of user friendliness can be achieved. Advantageously, a high degree of accuracy in determining the direction of view can be ensured. In particular, whenever a round instantaneous ellipse shape of the pupil contour is ascertained, it can be assumed that at that point in time the user is looking straight ahead. In this way, an alignment of the positions of the ellipse centers with the currently valid reference pupil contour can then be carried out. If the positions of the ellipse centers differ significantly during this, a displacement can be inferred and the new round instantaneous ellipse shape of the pupil contour can be defined as the new reference pupil contour. In particular, the replacement of the reference pupil contour can also take place only after a deviation has been ascertained several times in this way, for example twice, three times, etc., in order to advantageously avoid frequent false recalibrations. In particular, the replacement of the reference pupil contour can also take place only after a deviation has been ascertained over a certain minimum period of time, e.g. 0.5 seconds, in order to advantageously avoid frequent false recalibrations.

According to an example embodiment of the present invention, it is further provided that when a displacement of the data glasses is recognized, the position of the reference pupil contour is readjusted, in particular adaptively. In this way, a high level of user friendliness can advantageously be achieved.

Further, according to an example embodiment of the present invention, a set of data glasses is proposed having a virtual retina scan display, having a) a scanned laser projector, which is provided for projecting at least substantially parallel infrared laser beams onto an eye of a user of the data glasses, b) a detector, in particular an infrared detector, which is provided for acquiring two-dimensional images from the infrared laser beams reflected back from the eye of the user, and c) a computing unit which is provided for determining pupil contours from the acquired two-dimensional images, the computing unit being provided for ascertaining an instantaneous direction of view of the user of the data glasses from a comparison of an instantaneous elliptical shape of the pupil contour with an elliptical shape of a reference pupil contour. This can advantageously enable a particularly simple calculation of eye models, which in particular can save resources and energy. In addition, a particularly robust determination of the view vector can advantageously be enabled. "Provided" is to be understood in particular as meaning specially programmed, designed, and/or equipped. The statement that an object is provided for a certain function is to be understood in particular as meaning that the object fulfills and/or executes this particular function in at least one application and/or operating state. A "computing unit" is to be understood in particular as a unit with an information input, an information processing part, and an information output. Advantageously, the computing unit has at least one processor, a memory, input and output means, further electrical components, an operating program, regulation routines, control routines, and/or calculating routines. Preferably, the components of the computing unit are situated on a common circuit board and/or are advantageously situated in a common housing. In particular, the computing unit can be at least partially integrated into a frame of the data glasses. Advantageously, the detector can be realized so as to be integrated in the laser projector (example: VIP-VCSEL: "VCSEL with integrated photodiode").

In addition, according to an example embodiment of the present invention, it is provided that the computing unit is provided to recognize a displacement, in particular a planar translational and/or rotational displacement, of the data glasses relative to the eye of the user by comparing an instantaneous position of the pupil contour in a currently ascertained two-dimensional image with a position of the reference pupil contour in the two-dimensional image. In this way, a high robustness of a determination of the view vector, in particular against planar translational and/or rotational displacements of the data glasses, can advantageously be achieved. Advantageously, a high degree of user friendliness can be achieved.

The method according to the present invention and the data glasses according to the present invention are not intended to be limited to the application(s) and embodiment (s) described above. In particular, for fulfilling a mode of functioning described herein the method and data glasses according to the present invention can have a number of individual elements, components and units, as well as method steps, differing from a number thereof mentioned herein. In addition, for the ranges of values indicated in the present disclosure, values within the named limits are also intended to be considered as disclosed and usable as desired.

BRIEF DESCRIPTION OF THE DRAWINGS

Further advantages result from the following description of the figures. The figures show an exemplary embodiment of the present invention. The figures, description, and the other disclosure herein contain numerous features in combination. A person skilled in the art will expediently also consider the features individually and combine them to form useful further combinations.

BRIEF DESCRIPTION OF THE DRAWINGS

Figure 1:
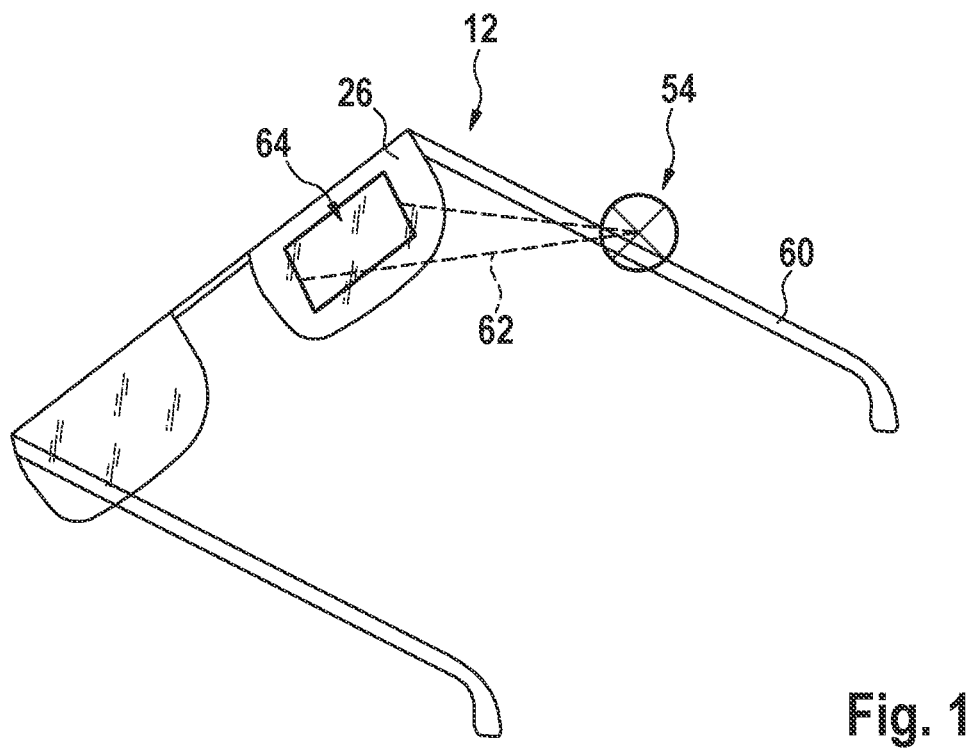

FIG. 1 shows a schematic representation of a set of data glasses, according to an example embodiment of the present invention.

Figure 2:
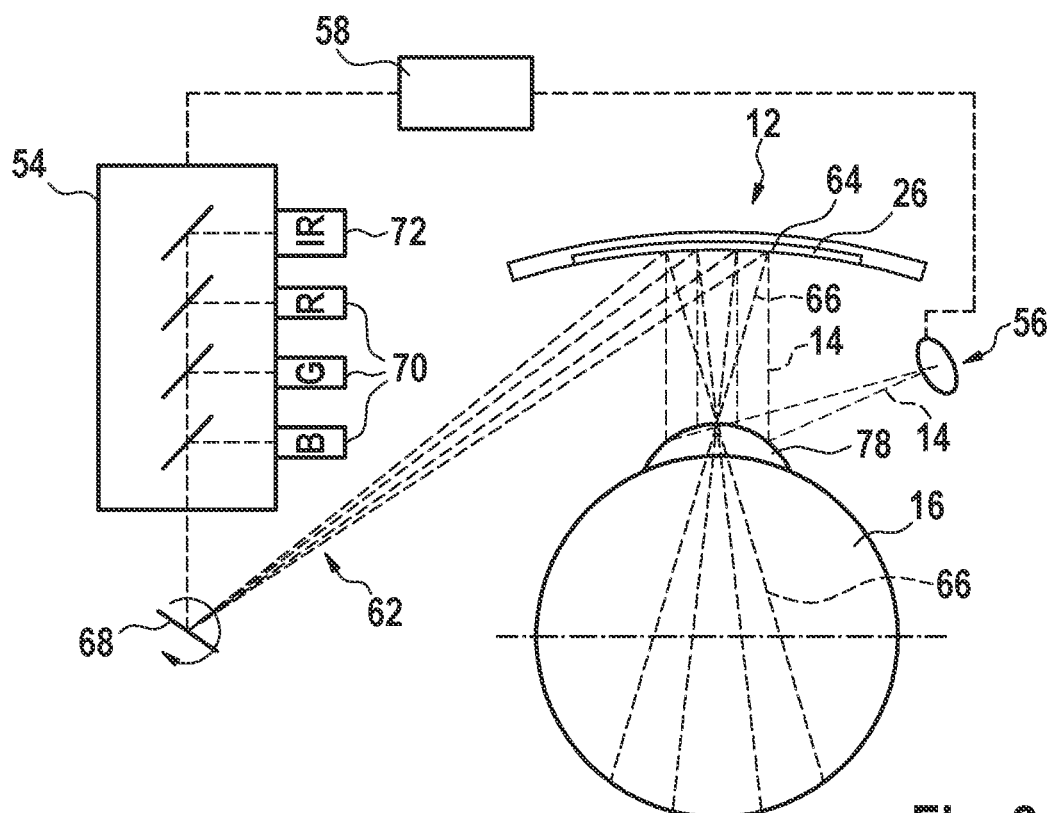

FIG. 2 shows a schematic representation of a basic mode of operation of the data glasses, according to an example embodiment of the present invention.

Figure 3:
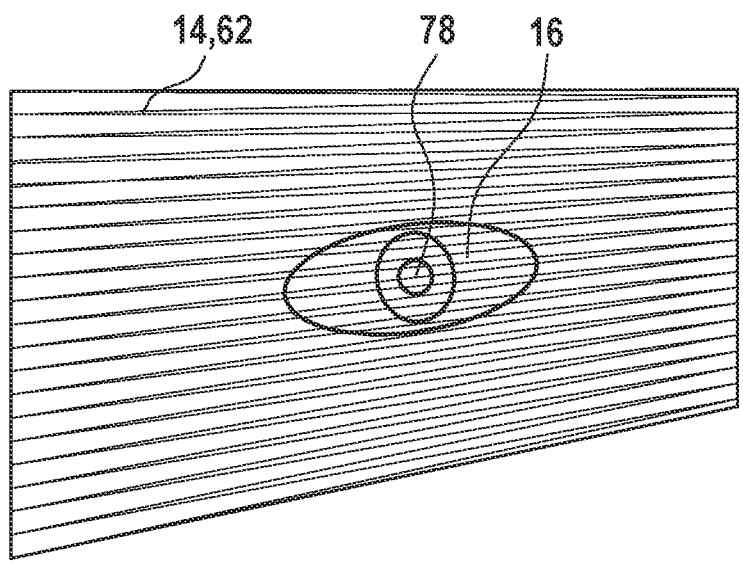

FIG. 3 shows schematically, a scanning area of an infrared laser beam of the data glasses, according to an example embodiment of the present invention.

Figure 4:
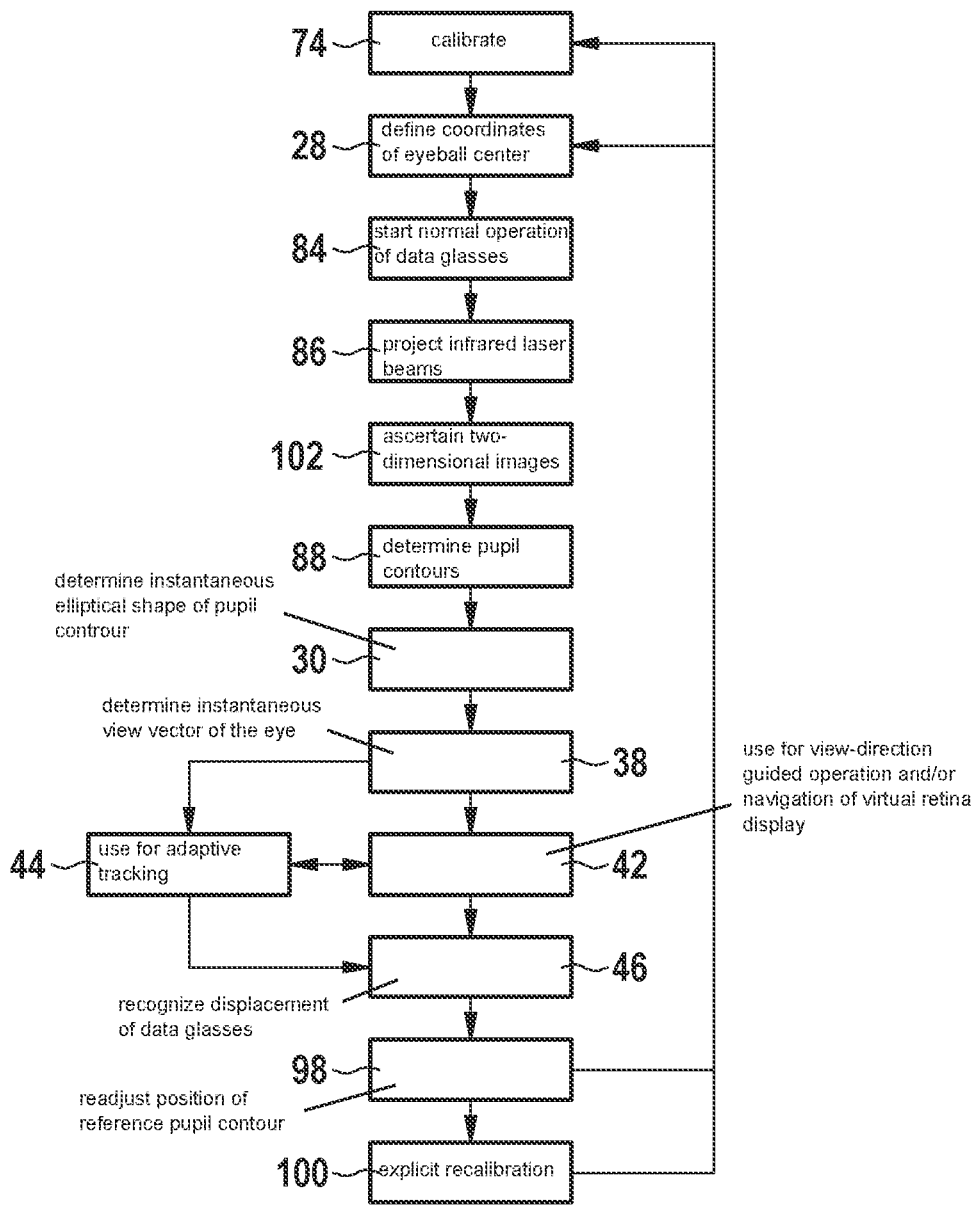

FIG. 4 shows a schematic flow diagram of a method for determining the instantaneous viewing direction of the user of the data glasses, according to an example embodiment of the present invention.

Figure 5:
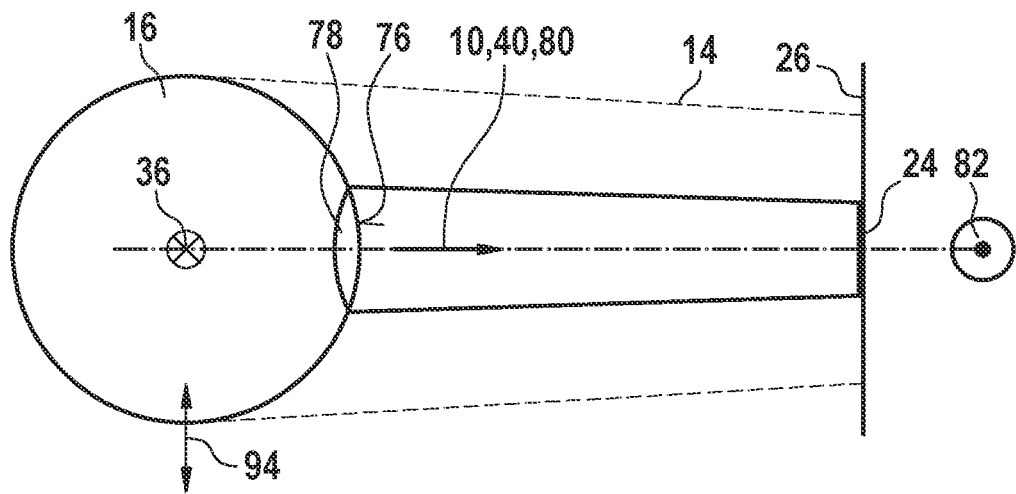

FIG. 5 shows a schematic side view of the eye of the user during a calibration step of the method, according to an example embodiment of the present invention.

Figure 6:
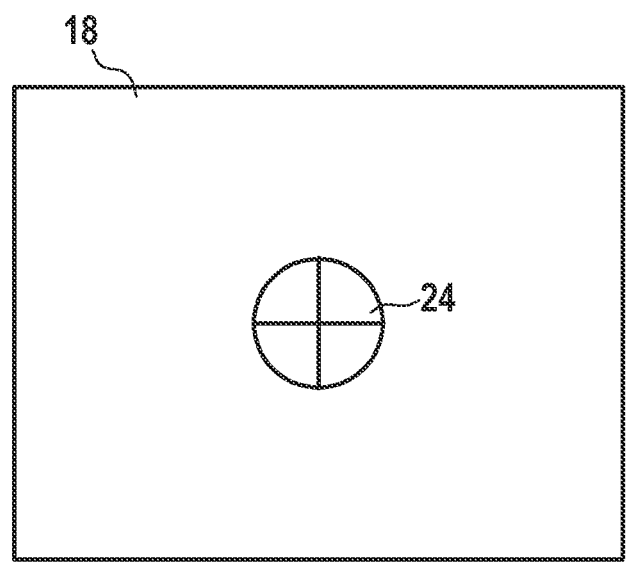

FIG. 6 shows schematically, an exemplary two-dimensional image of a reference pupil contour recorded by a detector of the data glasses, according to an example embodiment of the present invention.

Figure 7:
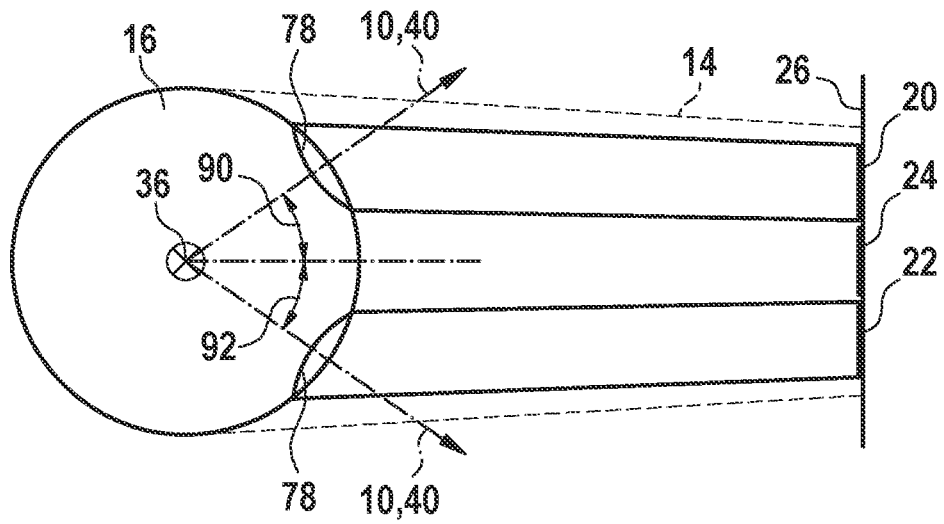

FIG. 7 shows a schematic side view of the eye of the user with different viewing directions, according to an example embodiment of the present invention.

Figure 8:
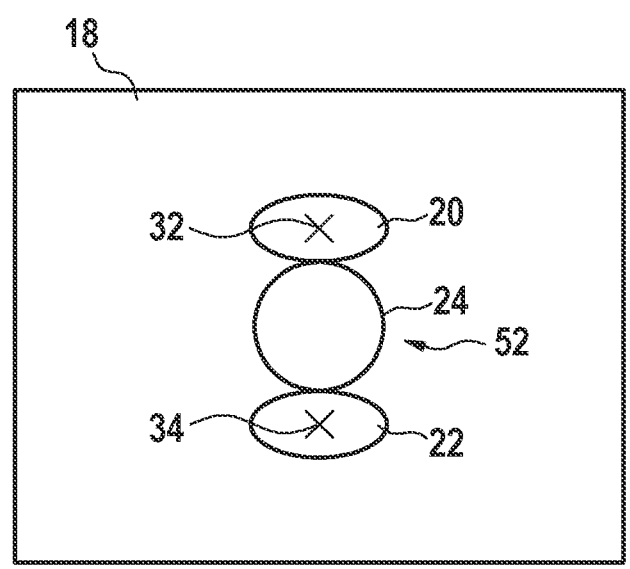

FIG. 8 shows schematically, further exemplary two-dimensional images recorded by the detector with pupil contours associated with different viewing directions, according to an example embodiment of the present invention.

Figure 9:
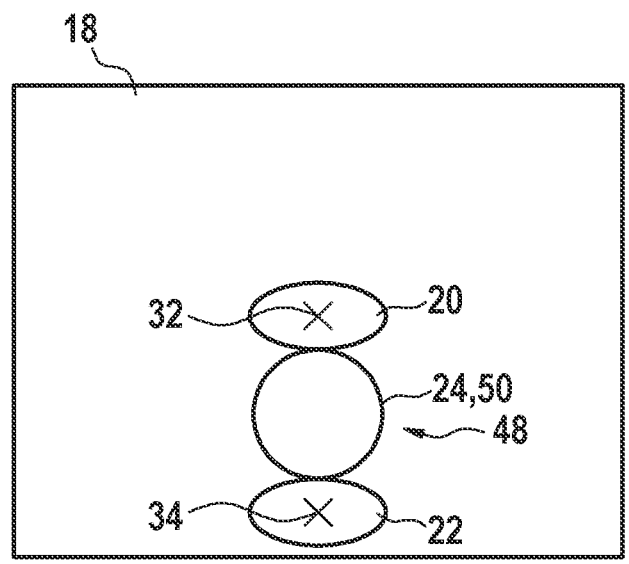

FIG. 9 shows schematically, further exemplary two-dimensional images recorded by the detector with pupil contours associated with different directions of view after a displacement of the data glasses relative to the situation shown in FIG. 8, according to an example embodiment of the present invention.

Figure 10:
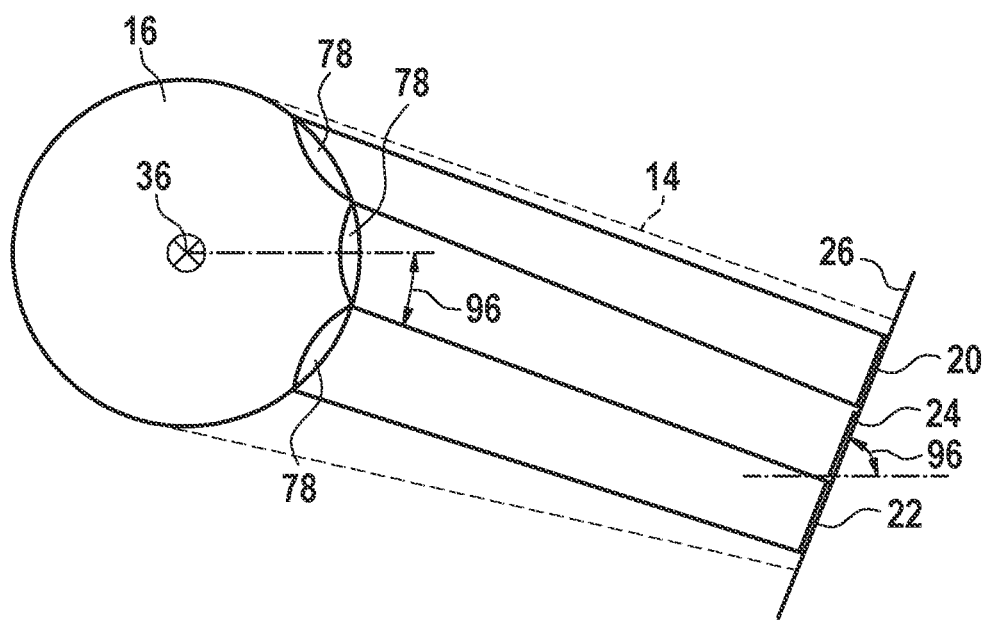

FIG. 10 shows a schematic side view of the eye of the user during a rotational displacement of the data glasses, according to an example embodiment of the present invention.

DETAILED DESCRIPTION OF EXAMPLE EMBODIMENTS

FIG. 1 shows a schematic representation of a set of data glasses 12. Data glasses 12 have a virtual retina display. Data glasses 12 include an eyeglass frame 60. Data glasses 12 include eyeglass lenses 26. Data glasses 12 have a scanned laser projector 54. Laser projector 54 is provided at least for projecting at least substantially parallel infrared laser beams 14 onto an eye 16 of a user of data glasses 12. Laser projector 54 is at least partially integrated into eyeglass frame 60. At least one of the lenses 26 includes a diffractive optical element (DOE 64). The DOE 64 is integrated into lens 26. In the case shown in the figures, DOE 64 is formed as a holographic optical element (HOE).

FIG. 2 shows a schematic representation of a basic operating mode of data glasses 12. Laser projector 54 is provided to output a scanned laser beam 62. The laser projector 54 includes a scanning device 68, which is provided for the two-dimensional scanning of a laser beam generated e.g. by laser diodes. Scanning device 68 may be designed as a MEMS mirror array. Laser beam 62 outputted by laser projector 54 includes visible laser beams 66. Laser beam 62 outputted by laser projector 54 includes infrared laser beams 14. For the outputting of the visible laser beams 66, laser projector 54 includes RGB laser diodes 70. For the outputting of the infrared laser beams 14, laser projector 54 includes an infrared laser diode 72.

DOE 64 reflects and focuses the visible laser beams 66 emitted by laser projector 54 into a pupil plane of the eye 16 of a user. The visible portion of the scanned laser beam 62 thus entering the eye 16 produces an image on a retina of the eye 16. DOE 64 reflects and parallelizes the infrared laser beams 14 outputted by laser projector 54. The invisible portion of scanned laser beam 62 impinging in this way on eye 16 sweeps over an area of eye 16 which is significantly larger than a pupil 78 of eye 16 (cf. FIG. 3). A portion of the scanned infrared laser beams 14 impinging on pupil 78 enters eye 16 and is reflected by the retina. A further portion of the scanned infrared laser beams 14 impinging on the user outside the pupil 78 is reflected back by a surface of the user, e.g. a surface of the eye 16 around the pupil 78. Due to the optical properties of the retina, a reflection signal from the retina differs significantly from a reflection signal from the other surfaces of the user. The retina of the eye 16 produces a comparatively increased retroreflection, while the other surfaces of the user produce comparatively increased non-directional scattering. When the reflection signal is viewed in the direction of the beam, pupil 78 thus appears brighter than the other surfaces (bright pupil effect). When the reflection signal is viewed at an angle to the beam direction, pupil 78 thus appears darker than the other surfaces (dark pupil effect). These two effects can be used for pupil recognition and for acquiring a pupil contour 20, 22, 24.

Data glasses 12 have a detector 56. Detector 56 is provided at least to detect infrared light. Detector 56 acquires the back-reflected light of the infrared laser beams 14. Detector 56 is provided for acquiring two-dimensional images 18 (cf. FIG. 8 or 9, inter alia) from the infrared laser beams 14 reflected back by the eye 16 of the user. In the case shown in FIG. 2, detector 56 is formed separately from laser projector 54 (dark pupil effect). Alternatively, detector 56 could be integrated into the laser projector 54, e.g. as a photodiode integrated into a cavity of an LFI laser sensor (bright pupil effect). Data glasses 12 have a computing unit 58. Computing unit 58 is provided for determining pupil contours 20, 22, 24 from the two-dimensional images 18 acquired by detector 56. Computing unit 58 is provided for ascertaining an instantaneous viewing direction of the user (cf. FIG. 7) of data glasses 12 from a comparison of an instantaneous elliptical shape of pupil contour 20, 22 with an elliptical shape of a reference pupil contour 24 (see FIG. 6, inter alia). Computing unit 58 is provided to recognize a planar translational and a rotational displacement of data glasses 12 relative to eye 16 of the user by comparing an instantaneous position 48 of pupil contour 50 in a currently ascertained two-dimensional image 18 with a position 52 of reference pupil contour 24 in two-dimensional image 18 (see comparison of FIGS. 8 and 9).

FIG. 4 shows a schematic flow diagram of a method for determining the instantaneous direction of view 10 of the user of data glasses 12 with the virtual retina display (retina scan display). In the method, the instantaneous viewing direction 10 of the user of data glasses 12 is ascertained from a comparison of an instantaneous elliptical shape of pupil contour 20, 22 with an elliptical shape of a reference pupil contour 24 (cf. also FIG. 7). In at least one calibration step 74, a reference pupil contour 24 for a user is ascertained. The ascertaining of reference pupil contour 24 is done by computing unit 58 based on the image data from detector 56. Calibration step 74 is performed when the user uses data glasses 12 for the first time. Reference pupil contour 24 corresponds here to the pupil contour 24 that is acquired while the user is looking straight ahead through the lenses 26 of data glasses 12 (cf. FIG. 5). In this case, a pupil surface 76 of the eye 16 can be assumed to be substantially flat or at least point-symmetrical about a center point of a pupil 78. A normal vector 80 of pupil 78 is here antiparallel to the parallel infrared laser beams 14 coming from DOE 64 onto eye 16. As a result, pupil 78 appears round in the reflection signal (cf. FIG. 6). Reference pupil contour 24 thus corresponds to a special form of an ellipse with equally large major and minor axes, i.e. a circle. In the calibration step 74, for the initial calibration a marker 82 (cf. FIG. 5) is virtually represented by the RGB projection of the visible laser beams 66 as a reference, which is intended to direct the user's view during calibration step 74. In at least one method step 28, which in particular represents a further calibration step, an eyeball center 36 of the eye 16 of the user is estimated based on the previously determined reference pupil contour 24. In method step 28, the coordinates of eyeball center 36 of the user's eye 16 are defined and stored in computing unit 58. To do this, a point of intersection of the major and minor axes of the ellipse of reference pupil contour 24 is ascertained and is extended, by a typical eyeball radius, perpendicular to a plane in which reference pupil contour 24 lies. The typical eyeball radius used for this purpose is 12 mm. Relative to a pupil plane of the eye 16, the coordinates of the eyeball center 36 are thus (x,y,−12 mm), where x and y are the position of the intersection of the major and minor axes of the ellipse of reference pupil contour 24 in the plane of the pupil.

In at least one further method step 84, the user starts normal operation of data glasses 12. In at least one further method step 86, the at least substantially parallel infrared laser beams 14 are projected onto the eye 16 of the user of the data glasses 12. In at least one further method step 102, two-dimensional images 18 are ascertained by detector 56 from the infrared laser beams 14 reflected back by the eye 16 of the user. In at least one further method step 88, pupil contours 20, 22, 24 are determined in the acquired two-dimensional images 18. Shapes of the pupil contours 20, 22, 24 in the two-dimensional images 18 are different as a function of the user's viewing direction 10. Positions of the pupil contours 20, 22, 24 in the two-dimensional images 18 are different as a function of the user's viewing direction 10. FIG. 7 shows an example, and schematically, the situation when the eye 16 is rotated upward by a first angle 90 and downward by a second angle 92 from a side view. When eye 16 is rotated by the first angle 90, the position of the image of pupil contour 20 is shifted to above the reference pupil contour 24 corresponding to a straight-ahead view. When the eye 16 is rotated by the second angle 92, the position of the image of the pupil contour 22 is shifted to below the reference pupil contour 24 corresponding to the straight-ahead view. FIG. 8 shows an example, and schematically, the two-dimensional images 18 that are recorded when the eye 16 is rotated upward by the first angle 90 and downward by the second angle 92. When the eye 16 is rotated by angles 90, 92, the pupil contours 20, 22 are each vertically compressed in comparison to reference pupil contour 24. In the case of rotations of the eye 16 to the side, the pupil contours 20, 22 would be compressed horizontally.

In at least one method step 30, a center 32, 34 of the instantaneous elliptical shape of the pupil contour 20, 22 is determined. The determining of centers 32, 34 is done by computing unit 58. The centers 32, 34 of the instantaneous ellipse shapes of the pupil contours 20, 22 correspond respectively to the points of intersection of the major and minor axes of the respective pupil contour 20, 22. In at least one method step 38, an instantaneous view vector 40 of the eye 16 of the user is determined (cf. FIG. 7). The instantaneous view vector 40 runs parallel to the direction of view 10 of the user. The instantaneous view vector 40 is ascertained by a linear connection of the eyeball center 36 and the respective center 32, 34 of the instantaneous ellipse shape of the pupil contour 20, 22. The instantaneous view vector 40 is ascertained in spherical coordinates and is taken over by computing unit 58. In at least one method step 42, instantaneous view vector 40 is used by data glasses 12/computing unit 58 for view-direction-guided operation and/or navigation of the virtual retina display. In at least one additional or alternative method step 44, instantaneous view vector 40 is used for an adaptive tracking of image contents projected by the virtual retina display onto a retina of the user's eye 16. This achieves an enlargement of a field of view of the virtual retinal display perceived by the user.

In at least one method step 46, a displacement of data glasses 12 relative to the eye 16 of the user is recognized. In method step 46, both planar translational (cf. arrow 94 in FIG. 5) and rotational displacements (cf. FIG. 10) can be recognized. A displacement of data glasses 12 requires a new locating of eyeball center 36 in order to continue to be able to determine an appropriate view vector 40. Consequently, the reference pupil contour 24 must be recalibrated. In method step 46, the displacement is detected by comparing the instantaneous position 48 of pupil contour 50 in a currently ascertained two-dimensional image 18 (cf. FIG. 9) with a previous position 52 of reference pupil contour 24 in the two-dimensional image 18 (cf. FIG. 8). During planar translational displacement, the position 48, 52 of the reference pupil contour 24 changes due to the parallel rays of another region of DOE 64 impinging on pupil 78 of eye 16. During the rotational displacement, the position 48, 52 of reference pupil contour 24 changes in that a detector plane and a pupil plane are tilted relative to each other. Due to the use of the parallel beam path of the infrared laser beams 14, a rotation of data glasses 12 in the two-dimensional images 18 of detector 56 behaves similarly to the planar translation of data glasses 12. The position 48 of pupil contour 50 for the straight-ahead view is displaced in the two-dimensional image 18, and a recalibration is required. For example, if data glasses 12 rotate by an angle 96 shown in FIG. 10, the positions 48 of the pupil contours 50 shift downward accordingly. However, because the infrared laser beams 14 are parallel, a round pupil contour 50 continues to result for the straight-ahead view, and a usable eyeball center 36, necessary for the above-described view direction recognition, can be redetermined.

The comparison of the instantaneous position 48 of pupil contour 50 with the position 52 of reference pupil contour 24 is carried out when a substantial agreement is recognized of the instantaneous elliptical shape of pupil contour 50 with the elliptical shape of reference pupil contour 24. The comparison of the instantaneous position 48 of pupil contour 50 with the position 52 of reference pupil contour 24 is carried out when the instantaneous elliptical shape of pupil contour 50 is recognized as round. Here, the fact is exploited that the user typically looks straight ahead several times a minute even without explicit instruction. This enables a fast readjustment without instruction. In at least one method step 98, as a result of recognizing a displacement of data glasses 12, the position 48, 52 of the reference pupil contour 24 stored in computing unit 58 is adaptively readjusted.

In an alternative or additional method step 100, an explicit recalibration can also be carried out again by using the virtual marker 82 again or by using content deliberately projected by the virtual retina display. In addition, it is possible that a defined calibration gesture carried out by the user is acquired and initiates the recalibration. In this way, the user can force a recalibration as soon as the user has the feeling that the view control is becoming inaccurate. In addition, to become robust against outliers, an adaptive readjustment of reference pupil contour 24 is possible, in which a learning factor is used to determine how much to trust a newly ascertained eyeball center 36, and how much to trust the previous eyeball center 36.

Based on this, a decision can then be made as to whether computing unit 58 will accept or reject the readjustment.

What is claimed is:

1. A method for determining a current viewing direction of a user of a pair of data glasses having a virtual retina scan display, the method comprising the following steps:
    projecting at least substantially parallel infrared laser beams onto an eye of a user of the data glasses;
    acquiring two-dimensional images from the infrared laser beams reflected back by the eye of the user; and
    determining pupil contours in the acquired two-dimensional images;
    wherein an instantaneous viewing direction of the user of the data glasses is ascertained from a comparison of an instantaneous elliptical shape of the pupil contour with an elliptical shape of a reference pupil contour.

2. The method as recited in claim 1, wherein the reference pupil contour corresponds to a pupil contour that is acquired while the user is looking straight ahead through eyeglass lenses of the data glasses.

3. The method as recited in claim 1, further comprising:
    estimating and/or determining an eyeball center of the eye of the user based on the reference pupil contour.

4. The method as recited in claim 3, further comprising:
    determining a center of the instantaneous elliptical shape of the pupil contour.

5. The method as recited in claim 4, further comprising:
    ascertaining an instantaneous view vector including spherical coordinates, a linear connection of the eyeball center and the center of the instantaneous elliptical shape of the pupil contour.

6. The method as recited in claim 5, further comprising: using the view vector for a view-direction-guided operation and/or navigation of the virtual retinal display.

7. The method as recited in claim 5, further comprising: using the view vector for an adaptive tracking of image contents projected by the virtual retinal scan display onto a retina of the eye of the user, such that an enlargement can be achieved of a perceived field of view of the virtual retinal scan display.

8. The method as recited in claim 1, further comprising: recognizing a planar translational and/or rotational displacement of the data glasses relative to the eye of the user is recognized through a comparison of an instantaneous position of the pupil contour in a currently ascertained two-dimensional image with a position of the reference pupil contour in the two-dimensional image.

9. The method as recited in claim 8, wherein the comparison of the instantaneous position of the pupil contour with the position of the reference pupil contour is carried out when a substantial agreement of the instantaneous elliptical shape of the pupil contour with the elliptical shape of the reference pupil contour is recognized, when the instantaneous elliptical shape of the pupil contour is recognized as round.

10. The method as recited in claim 8, wherein when a displacement of the data glasses is recognized, the position of the reference pupil contour is readjusted adaptively.

11. Data glasses having a virtual retina scan display, the data glasses comprising:
- a scanned laser projector configured to project at least substantially parallel infrared laser beams onto an eye of a user of the data glasses;
- a detector configured to acquire two-dimensional images from the infrared laser beams reflected back by the eye of the user;
- a computing unit configured to determine pupil contours from the acquired two-dimensional images, wherein the computing unit is configured to ascertain an instantaneous direction of view of the user of the data glasses from a comparison of an instantaneous elliptical shape of the pupil contour with an elliptical shape of a reference pupil contour.

12. The data glasses as recited in claim 11, wherein the computing unit is configured to recognize a planar translational and/or rotational displacement of the data glasses relative to the eye of the user through a comparison of an instantaneous position of the pupil contour in a currently ascertained two-dimensional image with a position of the reference pupil contour in the two-dimensional image.

* * * * *